Figure 1:
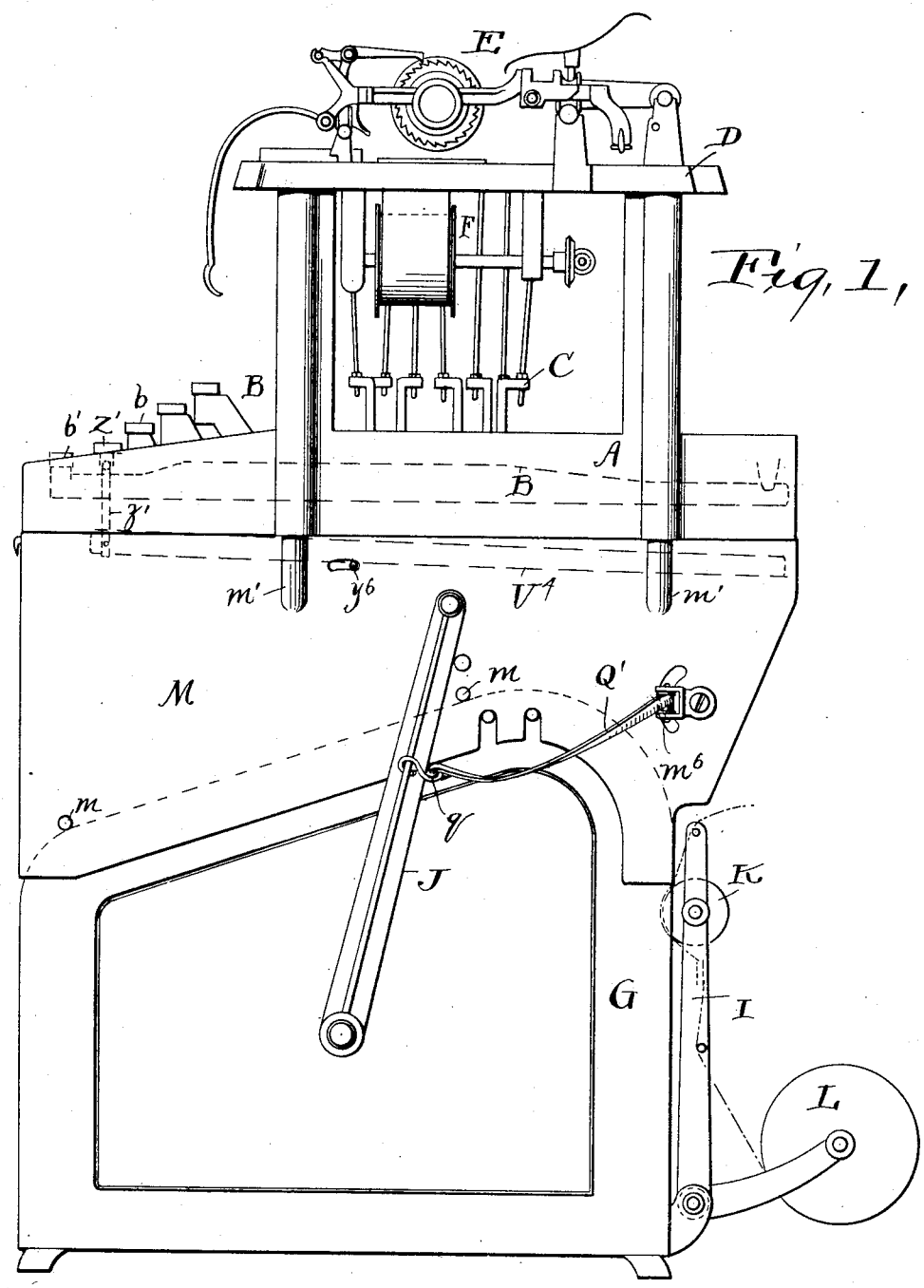

No. 686,627. Patented Nov. 12, 1901.
H. MARSHALL.
COMBINED TYPE WRITING AND COMPUTING MACHINE.
(Application filed July 30, 1900.)
(No Model.) 6 Sheets—Sheet 1.

Witnesses
E. B. Gilchrist
F. D. Ammen

Inventor,
Holmes Marshall,
By his Attorneys,
Thurston & Bates.

No. 686,627. Patented Nov. 12, 1901.
H. MARSHALL.
COMBINED TYPE WRITING AND COMPUTING MACHINE.
(Application filed July 30, 1900.)
(No Model.) 6 Sheets—Sheet 3.

Witnesses
E. B. Gilchrist
F. D. Ammen

Inventor,
Holmes Marshall
By his Attorneys,
Thurston & Bates.

No. 686,627. Patented Nov. 12, 1901.
H. MARSHALL.
COMBINED TYPE WRITING AND COMPUTING MACHINE.
(Application filed July 30, 1900.)
(No Model.) 6 Sheets—Sheet 4.

No. 686,627. Patented Nov. 12, 1901.
H. MARSHALL.
COMBINED TYPE WRITING AND COMPUTING MACHINE.
(Application filed July 30, 1900.)

(No Model.) 6 Sheets—Sheet 5.

Witnesses.
E. B. Gilchrist
F. D. Ammen

Inventor,
Holmes Marshall,
By his Attorneys,
Thurston & Bates

THE NORRIS PETERS CO., PHOTO-LITHO., WASHINGTON, D. C.

No. 686,627. Patented Nov. 12, 1901.
H. MARSHALL.
COMBINED TYPE WRITING AND COMPUTING MACHINE.
(Application filed July 30, 1900.)
(No Model.) 6 Sheets—Sheet 6.
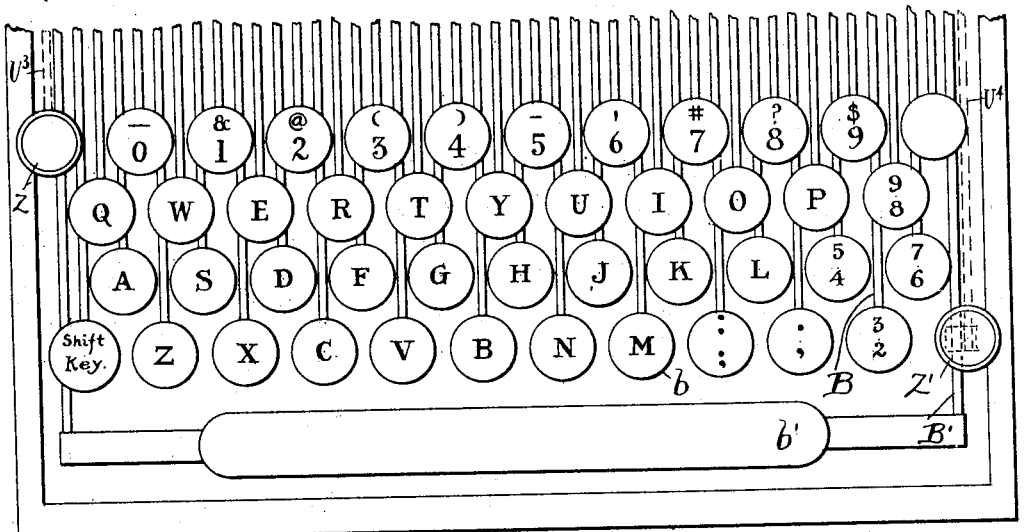
Fig. 9.
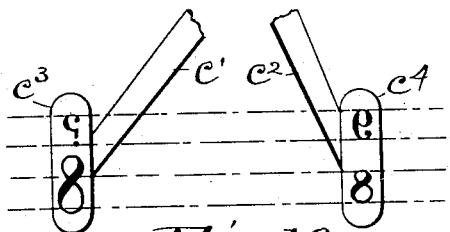
Fig. 10.
012345 used for adding.
012345 for ordinary work.
Fig. 11.
Witnesses
E. B. Gilchrist
F. D. Ammen
Inventor,
Holmes Marshall,
By his Attorneys,
Thurston & Bates.

UNITED STATES PATENT OFFICE.

HOLMES MARSHALL, OF CLEVELAND, OHIO, ASSIGNOR TO THE NATIONAL ADDOGRAPH COMPANY, OF NEW YORK, N. Y., A CORPORATION OF NEW JERSEY.

COMBINED TYPE-WRITING AND COMPUTING MACHINE.

SPECIFICATION forming part of Letters Patent No. 686,627, dated November 12, 1901.

Application filed July 30, 1900. Serial No. 25,258. (No model.)

*To all whom it may concern:*

Be it known that I, HOLMES MARSHALL, a citizen of the United States, residing at Cleveland, in the county of Cuyahoga and State of Ohio, have invented a certain new and useful Improvement in a Combined Type-Writing and Computing Machine, of which the following is a full, clear, and exact description, reference being had to the accompanying drawings.

My invention is for improvements in a combined type-writer and computing-machine of the general style shown in my prior patent, No. 575,570, granted to me January 19, 1897, and my prior application, Serial No. 677,586, filed April 14, 1898. The former of these patents illustrates a computer and a type-writer and a connection between them having a laterally-movable plunger-carriage which is coupled with the type-writer carriage, whereby the depression of the numeral-keys of the type-writer may both print and compute. My later patent referred to provides, among other things, means whereby marks—e. g., a period dividing dollars from cents—may be interspersed without affecting the calculation, there being a separate escapement for the computer-carriage.

The present invention has several objects, among which may be enumerated, first, the efficient and simple combining of a separate escapement for the computer-carriage with a system of plungers carried by such carriage, so that the connecting apparatus may be conveniently applied to an existing computing-machine having finger-keys; second, providing such connection between the type-writer and the intermediate mechanism that the type-writer may be easily removed; third, providing a disengaging mechanism adapted to be operated by the shift-key of the type-writer, so that the same keys which operate the computing-numerals may when the shift-key is pressed operate the other type without varying the computer; fourth, providing means for obviating the necessity of very accurate adjustment of the intermediate connection between the type-writer keys and the computing-keys; fifth, providing means for checking the printed result. A sixth specific object of the invention is to provide an intermediate mechanism adapted to be used with a Remington type-writer and an arithmometer, such as is now on the market, being manufactured by the American Arithmometer Company of St. Louis.

The invention consists in the means I employ for accomplishing the above objects and the general objects of simplifying and cheapening the construction and rendering it more efficient and the means I have devised of consolidating some of the operations of the type-writer or arithmometer with operations required in the intermediate connection, a general object being to provide an efficient combined type-writing and computing machine made in simple and separable form, whereby the type-writer may be used alone for the ordinary operations thereof or the computer used alone for its ordinary operations, or the two together with my intermediate mechanism for the joint purpose of simultaneously writing and computing.

The invention may be conveniently characterized as consisting of the combinations of elements hereinafter illustrated, and set out in the claims.

The drawings fully illustrate my combined type-writer and computing-machine, there being shown with sufficient fullness a type-writer of the Remington type, a computing-machine of the arithmometer type, and my intermediate connection between them.

Figure 2:
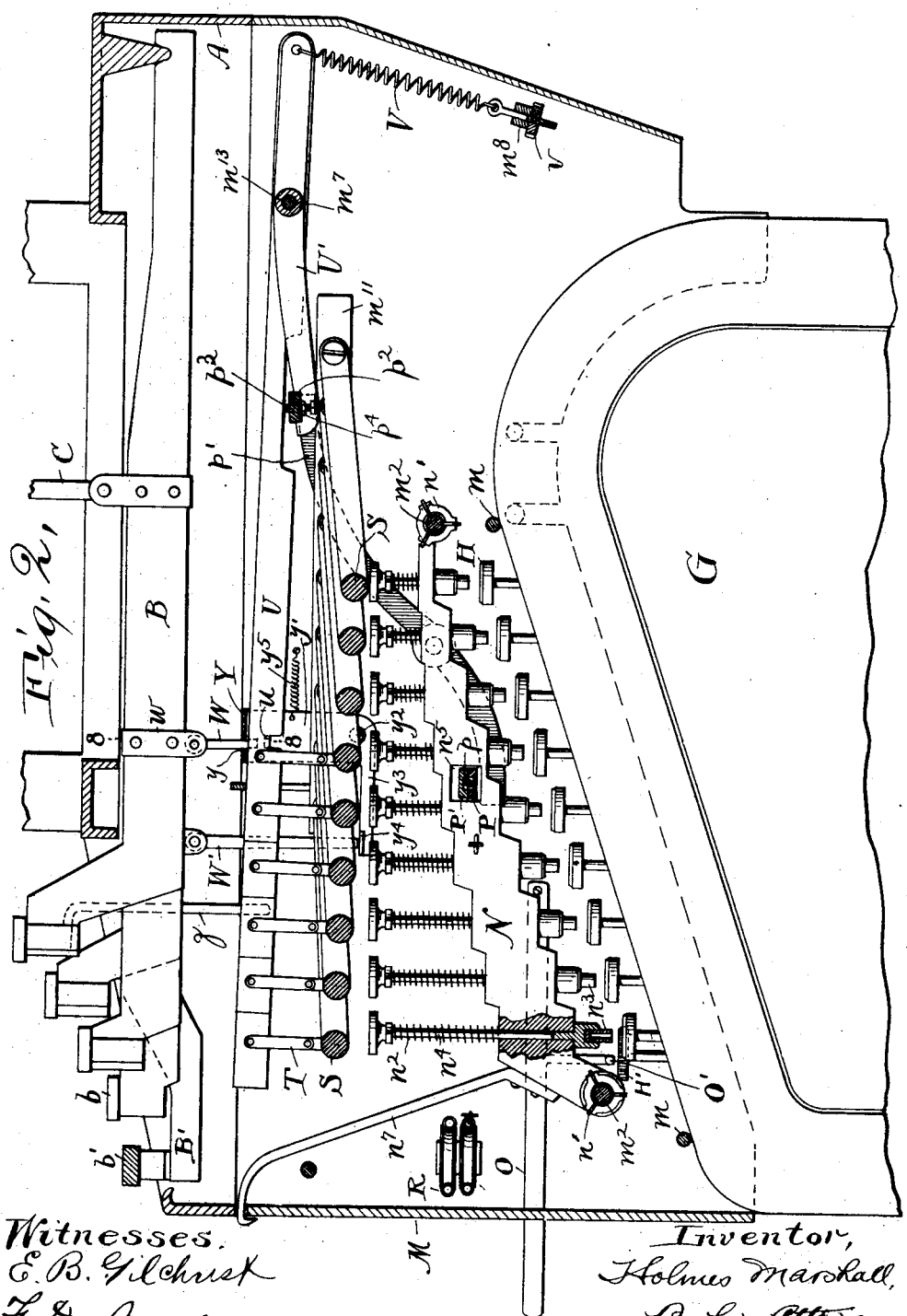
Figure 3:
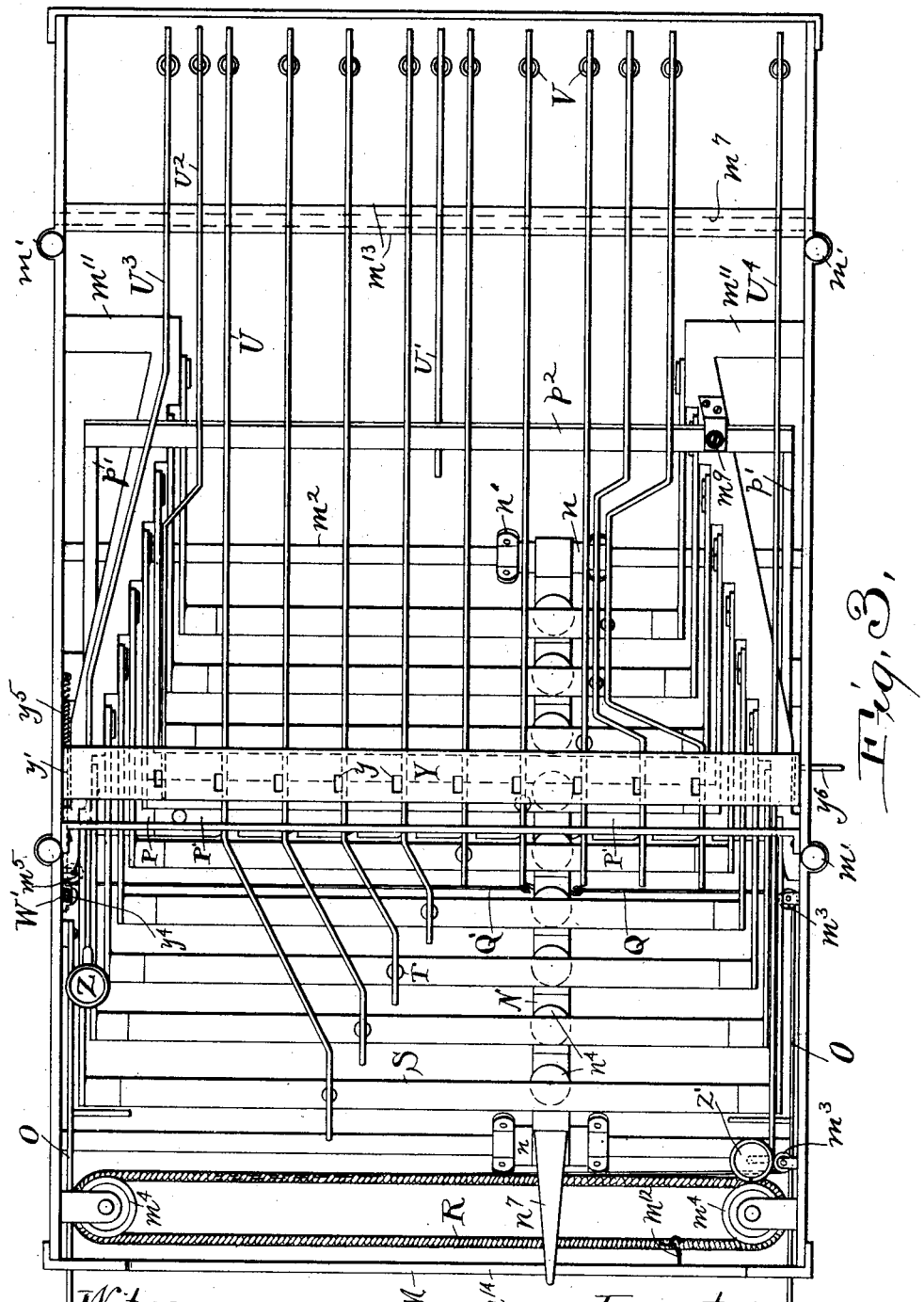
Figure 4:
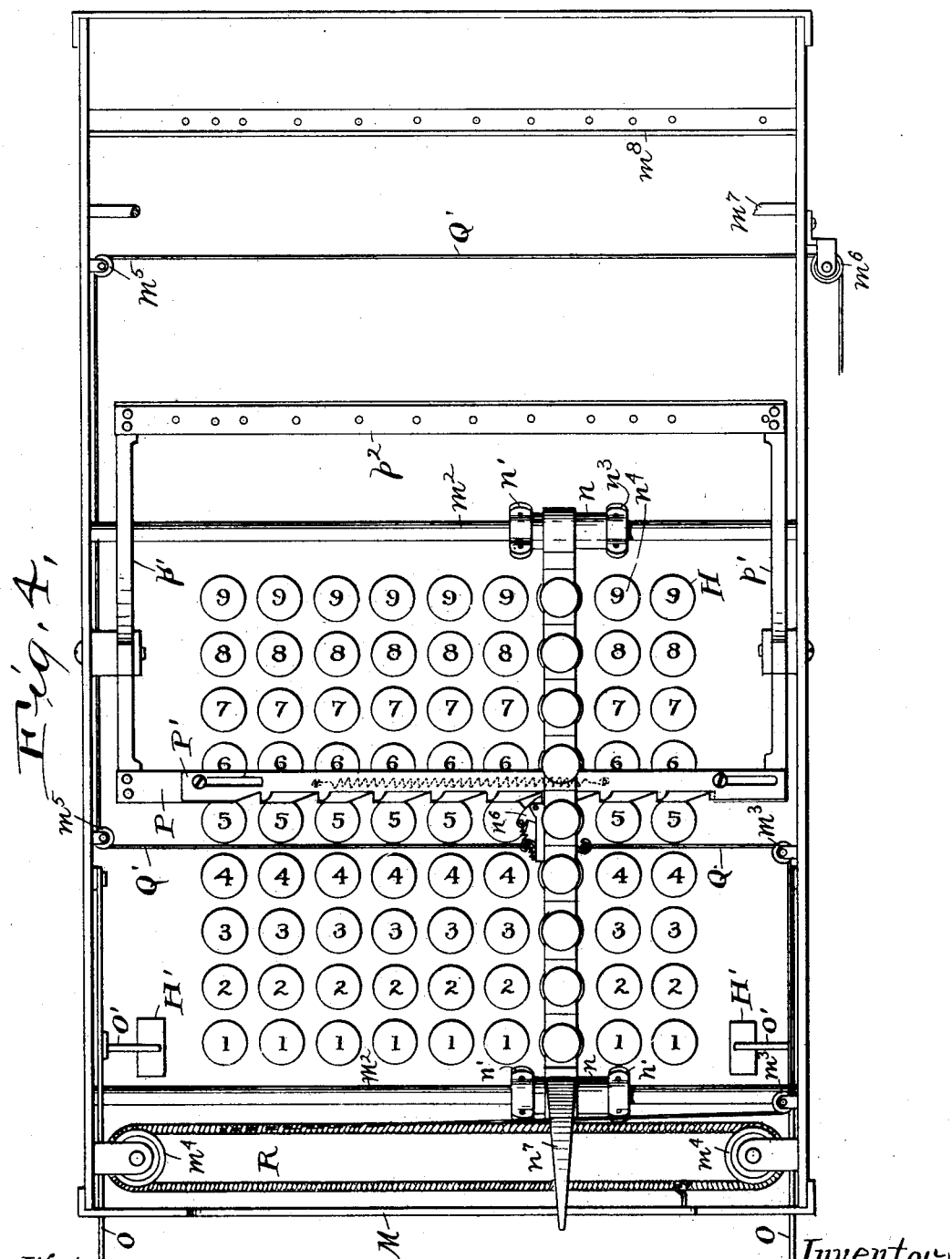
Figure 5:
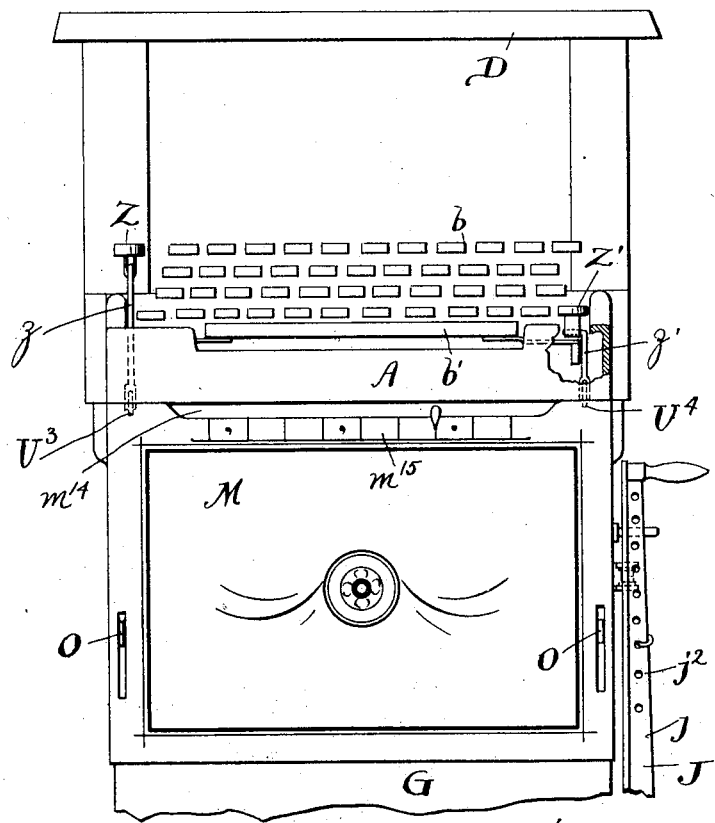
Figure 6:
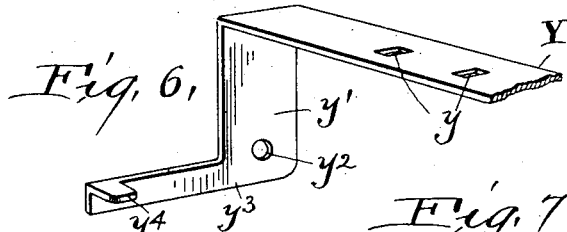
Figure 7:
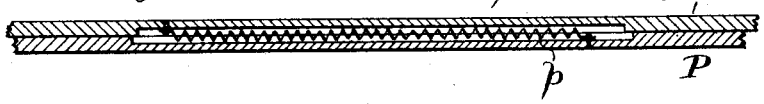
Figure 8:
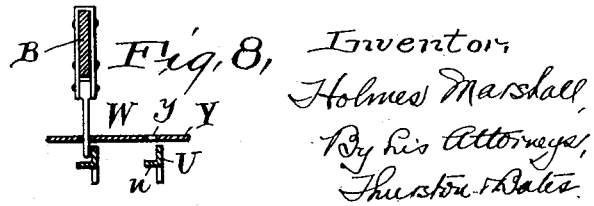

Figure 1 is a side elevation of such complete construction. Fig. 2 is a sectional side elevation through my intermediate connection and through the keyboard of the type-writer and showing also the keyboard of the computer. Fig. 3 is a plan of the intermediate mechanism, the type-writer being removed. Fig. 4 is a similar plan with the bars and their operating-levers removed. These three latter figures are on the same scale, larger than the scale of Fig. 1. Fig. 5 is a front elevation of the intermediate connection and the lower part of the type-writer, being on the same scale as Fig. 1. Fig. 6 is a detail in perspective of the bar for disengaging the connection from the type-writer when the shift-key is used. Fig. 7 is a vertical section through the two bars of the computer-escapement, and Fig. 8 is a vertical section on the line 8 8 of Fig. 2. Fig. 9 is a plan of the type-writer keyboard. Figs. 10 and 11 are diagrams illustrating the two styles of numeral-type employed, the former showing the face of type-levers and the latter the printed product.

As stated, the type-writer shown is of the well-known Remington type, consisting of a keyboard-frame A, containing key-levers B, with keys $b$, which through suitable links C operate the type-levers.

D represents the top plate of the type-writer, supported by standards from the keyboard-frame, and on this top plate is the carriage E.

F represents the ribbon-roller.

The computer shown, as mentioned, is an arithmometer and may be considered as constructed in accordance with Patents Nos. 388,116, 388,117, 388,118, and 388,119 to W. D. Burroughs for calculating-machines. It includes the inclosing casing G of the box-like form shown, carrying on its upper surface finger-keys H, arranged in longitudinal rows of nine keys each. The number of rows depends on the capacity of the machine, nine being shown. The transverse row nearest the front are the No. 1 keys, the next row behind (which for convenience is placed a little higher) are the No. 2 keys, and the row next above and behind it the No. 3, and so on. The keys are depressed as the number is written. Thus if the number to be added were "4081" the following keys would be depressed: the fourth key back from the front in the fourth longitudinal row from the right, the third longitudinal row would be skipped, the next to the rear key in the second longitudinal row being depressed, and the front key in the row at the extreme right. When such keys have been depressed, a pull forward on the operating-lever J causes the amount to be added onto that previously on the computing mechanism within the casing, and at the same time the number is printed on the paper running over an impression-roller K, carried in the frame I at the rear of the machine. A second consecutive pull on the lever J, together with the depression of an additional key H', prints the total on the strip of paper. Two additional keys H' are provided on the keyboard of the computer at the side of the main keyboard, one of which is depressed when it is desired to duplicate figures already printed and the other of which is used for preventing the addition of a number wrongly written and for printing the total by a second pull of the lever J, as stated.

The particular construction of the interior of the arithmometer is not a part of the present invention and is not shown. Any approved suitable computing mechanism may be used, whether the computer prints on its own paper, as shown, or simply discloses the added amount, though the additional printed record is in many cases a desirable feature.

The connecting mechanism between the type-writer and the computing-machine will now be described. This mechanism is inclosed within a frame in the form of a box M, open at its upper and under sides and so shaped as to seat on the arithmometer and carry the type-writer. It has a pair of rigid bars $m$, which rest on the upper surface of the computer-frame, supporting the box, while the box carries studs $m'$, projecting upward, which take into the usual openings in the lower ends of the standards of the Remington type-writer provided for the rubber feet. Slidable upon a pair of rigid rods $m^2$, extending across the box M, is the computer-carriage N. This carriage preferably consists of the stepped-shape body, as shown, having at each end a sleeve $n$ around the rod $m^2$, which sleeves preferably carry near each end thereof three antifriction-wheels $n'$. This body or carriage N carries nine plungers $n^2$, which are adapted to stand over any longitudinal row of keys H in the computer. These plungers are provided with heads at their upper ends, with protrusive springs $n^4$ about their shanks, and with cushioned feet, consisting of a rubber projection $n^3$, provided to allow some descension of the plunger after the key H has been depressed to its limit. The escapement for the computer-carriage extends loosely through an opening $n^5$ therein and consists of a pair of notched bars P P', the bar P' having a longitudinal movement with reference to the bar P equal to the distance between the notches and given a tendency to move toward the left by a tensile spring $p$, embraced within recesses in the bars and secured one end to one bar and one to the other. The bar P is carried on the ends of a pair of pivoted levers $p'$, which are connected by the cross-bar $p^2$. This cross-bar is pressed upward by engagement on its under side of a lever U', to the other end of which is attached a tensile spring V, adjustable by a nut $v$, engaging a bar $m^8$, extending across the box. The bar $p^2$ is thus continuously given a pressure upward, being stopped by the set-screw $m^9$, carried by one of the brackets $m^{11}$, secured to the box. The bar carries set-screws $p^3$, (locked by jam-nuts $p^4$,) which are engaged by operating-levers U U$^2$ U$^3$ U$^4$, hereinafter described, to give the proper vertical movement to the escapement-bars when any of these levers are depressed. In the normal position of the parts the notches of both bars P P' are engaged by a dog $n^6$, carried by the body N. A long helical spring R is secured at $m^{12}$ to the frame, and after passing around pulleys $m^4$ $m^4$, carried by the frame, is connected by a cord or strap Q, which passes over pulleys $m^3$ $m^3$ to the computer-carriage N, whereby the carriage is given a tendency to move toward the right. The force of this spring R is greater than the spring $p$, wherefore when the arm $p^2$ is depressed sufficiently to raise the bar P' out of engagement with the dog $n^6$ the bar P' moves to the left a distance of one tooth; but when the bar P' comes down into engagement with the dog and the bar P is freed therefrom the spring R draws the computer-carriage to the right the movement allowed to the bar P'. The computer-carriage is drawn back to the left by a cord or strip Q', secured to its left side and passing over pulleys $m^5$, carried by the box, and then around the pulley $m^6$, on the outside thereof, and finally attached to the lever J for operating the computer. Thus when the lever J is drawn forward at the end of any number written, as is necessary to print and add that number, the computer-carriage is also drawn back to the left, ready to start a new number.

Any desired number of longitudinal rows of keys H may be provided, according to the capacity of the computer, the machine shown in the drawings having nine rows, enabling the computer to add up to anything less than a thousand million, or when adding dollars and cents up to nine million nine hundred and ninety-nine thousand nine hundred and ninety-nine dollars and ninety-nine cents. Most frequently the columns to be added will not contain any numbers requiring the use of the keys in one or more of the rows at the extreme left, and in these cases it is a saving of time not to draw the computer-carriage to the extreme left, as this requires perhaps several idle escapements to bring the carriage to the first printing position. To provide the above-mentioned advantage, I form in the web $j$ of the lever J nine holes $j^2$, into any one of which the hook $q$ on the forward end of the strap Q' may take. These holes are so placed that the full movement of the lever J gives the strap Q' just the right pull to move the computer-carriage the amount corresponding to the hole $j^2$ employed. Thus when the computer-carriage is to be moved each time to its extreme left the hook $q$ takes into the uppermost hole $j^2$ in the lever J. When no number is to be frequently written larger than nine hundred and ninety-nine cents, for example, the hook $q$ takes into the third hole from the bottom, as shown in Fig. 5. This draws the computer-carriage back simply to the third longitudinal row of keys H from the right. This is as shown in Fig. 4.

In order that the operator may see just where the computer-carriage is, a pointer is provided in the form of a bar $n^7$, secured to the forward end of the body N and projecting out through a depression $m^{14}$ in the upper edge of the front of the box M, just beneath the front plate of the keyboard of the typewriter. A scale $m^{15}$ is provided along this edge below the depression. In Fig. 5 this scale appears, with a period indicating the position between dollars and cents, a comma for separating thousands from hundreds, and a comma for separating millions from thousands, and straight vertical lines on each side of these points to indicate the numerals. The pointer shows the machine to be in position to print in the units-column of the dollars, which, as stated, is the position of the computer-carriage and of the hook $q$ in the lever J in this figure and in Fig. 4. A pair of levers O are provided on the inner surface of each side of the box which have downwardly and inwardly extending arms $o$, adapted to take onto the keys H', whereby the depression of the forward ends of those levers depresses the keys. The box M thus does not interfere with performing any of the operations of the computing-machine. Directly over the nine plungers $n^2$ are nine bails S, pivoted to the brackets $m^{11}$, carried by the box, and these bails are connected by links T with levers U, pivoted on the rod $m^7$ and drawn downward by springs V. The various levers on the rod $m^7$ are separated by thimbles $m^{13}$ thereon. Each of the levers U has on its side a lip $u$, formed by turning to the side a portion of the lever, and above these lips are depending arms W, pivoted by suitable straps $w$ to the key-levers B, which print the numerals on the type-writer. The pivoted arms W pass through openings $y$ in a bar Y, whereby they are guided onto the lips $u$. Thus whenever a numeral-key is depressed the arm W depresses the lever U, and this depresses the corresponding bail, which depresses the corresponding plunger, which actuates the corresponding key H of the computer. It will be noticed that the arms W, though they project below the base-line of the type-writer, are pivoted, as stated, to the key-levers, so that when the type-writer is removed to do its ordinary work these arms may be folded up along the under side of the key-levers, being there held in any suitable manner. The same is true of the longer depending arm W', to be hereinafter described, wherefore the removal of the type-writer does not require the removal of these arms, and the type-writer may be simply lifted off and used for its ordinary work without there being any loose parts to be taken care of. The distance between the bails S and the heads of the plungers is such that the natural depression of the finger-key to print will depress the keys H their right amount. To obviate the necessity, however, of the finest adjustment, the rubber feet $n^3$ are provided at the base of the plungers, and these feet allow a slight additional movement of the key-lever B after the key H has been depressed its full amount, so as to allow the type-bar to strike with the proper force against the paper on the type-writer carriage. This is an important feature, as otherwise it might easily happen that the key H would receive its full depression and stop the movement of the key-lever before the type-bar had struck with the required force on the paper.

In type-writers of the Remington type two characters are provided on each key and on each type-bar, the additional character being used by shifting the paper-carriage. In order that such additional characters shall be used on the numeral-keys without disarranging the computing operation, I form the guide Y movable instead of stationary and move it when the shift-key is depressed to swing the arms W out of alinement with the lips $u$, whereby the depression of the key-levers operates the type-writer only. This is accomplished by turning the ends of the bar Y downward, as at $y'$, and pivoting these arms at $y^2$ to the box M and providing one of these arms $y'$ with the forwardly-extending bell-crank arm $y^3$, which has a lip $y^4$, standing beneath an arm W', depending from a shift-key. A spring $y^5$, secured to one of the arms $y'$, normally holds the bar Y with the arms W above the lips $u$. When the shift-key is depressed, the whole bar Y is swung forward and all of the arms W are brought out of alinement with the lips $u$. A pin $y^6$, extending out through the box M, provides means for this shifting of the bar Y independently of the type-writer whenever desired. When the zero-key of the type-writer is depressed, it does not operate any of the keys H of the computer, but simply prints the "0" on the type-writer and causes an escapement of the computer-carriage. This is done by the lever $U^2$, corresponding to the levers U, in that it is journaled on the rod $m^7$ and lies over the escapement-bar $p^2$ and has a lip beneath the bar Y, though it is not connected with a bail.

It is sometimes desirable to move the computer-carriage without moving the type-writer carriage or without printing, and this is accomplished by a finger-key Z on the forward end of the lever $U^3$. This lever is journaled on the rod $m^7$ and operates the escapement, but otherwise does not affect the computer and has no influence whatever on the type-writer, though the key Z is so placed (by reason of a vertical shank $z$, connecting the key with the lever) that the key projects up into the keyboard of the type-writer and occupies a position as if it were part of that keyboard, being at one end of the keys therein.

The ordinary space-bar $b'$ of the type-writer operates the escapement for the type-writer carriage in the usual manner, but has no influence on the computer. It is frequently desirable, however, to cause a simultaneous escapement for both the computer and the type-writer, and this is accomplished by the lever $U^4$, pivoted on the rod $m^7$ and passing over the escapement-bar $p^2$ and carrying at its forward end the key Z' on a shank $z'$, which extends upward from the lever $U^4$ and then extends across the lever B', to which the escapement-bar $b'$ is secured. Thus when this key Z' is depressed both escapements are operated. It is thus apparent that the type-writer escapement may be operated alone, the computer-escapement alone, or both escapements together, according to the key depressed, while whenever a computing numeral-key is depressed the same operates to print on the type-writer and will operate to compute on the computer if the parts are in their normal position, or will have no effect on the computer if the bar Y is shifted to bring the upper-case characters on the numeral-keys into action, as heretofore described.

In practice there are many cases where numerals are used which it is not desired to add—as in dates, quantities, &c.—and to obviate the necessity of disconnecting the type-writer and computer whenever such numerals are to be used I provide an extra set of numerals which do not compute, but simply print on the type-writer. Fig. 9 shows the keyboard of a No. 7 Remington machine as adapted for my use. The numeral-keys in the upper row are those that connect with the computing-machine, while those near the right hand of the other rows do not so connect. It is an advantage to have the keys which compute arranged in a single transverse row, as shown, since they may be thus more easily connected with the intermediate connection to the computing-machine and that connection shifted, as already explained, though otherwise the arrangement of the keys is optional.

In order that it may be readily determined from an inspection of the printed matter whether the right characters have been used, I make the characters which compute show differently from those which do not. This is most easily accomplished by making them of different size or design. I use the term "different font" as including either. Fig. 10 shows at $c'$ $c^2$ the type-levers used with the "8" computing-key and the corresponding key which does not compute, respectively. The faces of these levers and the type thereon are shown at $c^3$ $c^4$. From this figure it will be seen that the "8" and "9" on the non-computing bar and the "?" on the computing-bar are all of the same font, while the "8" on this computing-bar is larger. This is further illustrated in Fig. 11, the large characters in the upper line being type whose keys are connected with the computing-machine and the smaller characters on the lower line (which it will be seen are of the same font as the letter-type) are to be used for ordinary writing. The amount of difference between the two sizes of figure-type is exaggerated for convenience of illustration.

For the convenient distinguishment of the keys on the type-writer a difference in size corresponding to the type is preferably made in the characters on the keys, as shown in Fig. 9. Now, for example, a bill could be written and added as follows:

July 18th, 500 bu. of wheat @ .74½ .. $372.50
July 20th, 60 tons of coal @ $3.25 .. 195.00
─────────
$567.50

Inspection of the numeral-type in this shows that the computing-keys have only been struck in the two amounts to be added and the computation taken from the adding-machine is accurate. The footing being printed with the non-computing type does not disarrange the computing-record. If computing-keys and non-computing keys had been wrongly used, it would appear at a glance from the printed result and the proper corrections could be made.

Having described my invention, I claim—

1. The combination of an adding-machine and type-writing machine, and a suitable intermediate connection between them adapted to communicate movement from the keys of the type-writer to the adding-machine, said intermediate connection being separable from both the adding-machine and the computing-machine while preserving its entity, being separately carried by a frame adapted to have its lower portion engage the upper part of the computing-machine and be carried thereby and having its upper portion adapted to engage the base of the type-writer and carry it, substantially as described.

2. The combination of an adding-machine, a box open at its base and adapted to snugly embrace the sides of the adding-machine near the upper surface, rods carried by said box adapted to rest on the upper surface of the adding-machine, a type-writer having openings in its base, upward projections carried by said box at the upper edge adapted to engage said openings, and mechanism within said box adapted to connect certain keys of the type-writer with keys of the adding-machine, substantially as described.

3. A separable intermediate connection for a type-writer and a computer-machine adapted to connect numeral-keys of the type-writer with keys of the computing-machine, which intermediate connection is bodily removable as a unit being self-contained within a frame adapted to engage the computing-machine near its upper edge and be carried thereby and adapted to itself engage the type-writer near its lower edge and carry it, substantially as described.

4. A separable connection for a type-writer and computing-machine adapted to convey movement from numeral-keys of the type-writer to the keys of the computer, said separable connection being self-contained within a box and adapted to be located above a computing-machine and beneath a type-writer, said box containing a laterally-movable computer-carriage having plungers adapted to engage the computer-keys, and a system of bails adapted to engage the plungers, an escapement mechanism for the computer-carriage, and a system of levers carried by said box and connected with said bails and adapted to be depressed by the depression of the keys of the type-writer, substantially as described.

5. A box adapted to stand above an adding-machine and beneath a type-writer, a laterally-movable carriage within said box having a system of depressible plungers adapted to engage the keys of the computing-machine, a system of bails extending across said plungers and each bail adapted to engage its plunger in various positions of the carriage, a system of levers located side by side and extending longitudinally of said box, links connecting the levers with their respective bails, an escapement for said computer-carriage operated by a bar extending across said levers whereby the depression of the lever operates to depress the corresponding computer-key and causes an escapement of the computer-carriage, substantially as described.

6. An intermediate connection for a type-writer and computing-machine including a laterally-movable carriage, an escapement-dog carried thereby, a pair of escapement-bars located in proximity to said dog, carrying mechanism movably carrying said bars, a system of levers operating to communicate movement from the type-writer to the computer, said levers engaging said carrying mechanism and operating the escapement, substantially as described.

7. An intermediate connection for a type-writer and a computing-machine consisting of a frame, a laterally-movable carriage having plungers adapted to engage the computing-machine, a pair of escapement-bars located in proximity to said carriage, a lever pivoted to the frame and connected with the escapement and with a system of levers extending across said bar, means operated by said levers adapted to depress the plungers, whereby the depression of a lever depresses the corresponding plunger and also operates the escapement, substantially as described.

8. An intermediate connection for a type-writer and computer consisting of a box adapted to stand between the two, a laterally-movable carriage within said box, a pair of escapement-bars located in proximity to said carriage, a pair of levers carrying said bars and pivoted to the sides of said box, a bar extending crosswise of the box carried by said levers, a system of levers extending longitudinally of the box across said cross-bar, set-screws carried by said cross-bar in proximity to said levers whereby the actuation of said system of levers may actuate the escapement and the degree thereof be adjusted by said set-screws, substantially as described.

9. An intermediate connection adapted to stand above an adding-machine and beneath a type-writer, a laterally-movable carriage within said connection having a system of depressible plungers adapted to engage the keys of the computing-machine, a system of levers located side by side and adapted to depress said plungers, there being lips carried by said levers, combined with a removable type-writer having arms extending downward from its key-levers, but not fastened to the intermediate connection, and means for guiding said arms to engage said lips, substantially as described.

10. A computing-machine, and a type-writer having numeral-keys and provided with a shift, combined with an intermediate connection between the type-writer and the computing-machine whereby the depression of numeral-keys of the type-writer normally actuates the computing-machine, and means operated by said shift for disengaging such connection, substantially as described.

11. The combination of a type-writer and a connection adapted to carry movement from the type-writer to a computing-machine, said connection including depressible levers, means connecting said levers with the key-levers of the type-writer, and mechanism for disengaging said connection, substantially as described.

12. The combination with a type-writer of a connection adapted to carry movement from the type-writer to a computing-machine, said connection including depressible levers, movable arms between said levers and the key-levers of the type-writer, and means for guiding said arms to engage said levers and for shifting them out of such engagement, substantially as described.

13. The combination, with a type-writer, of a connection adapted to carry movement from the type-writer to a computing-machine, said connection including movable arms, a guide for determining the position of said arms, means for shifting said guide automatically by the type-writer shift and also independently thereof, substantially as described.

14. The combination of a type-writer having downwardly-extending pivoted arms carried by the key-levers of its numeral-keys, and a connection adapted to be located beneath the type-writer and to communicate movement from numeral-keys thereof to an adding-machine, said connection including means normally engaged and operated by said pivoted arms, a movable guide engaging said pivoted arms and serving normally to guide them to cause such movement, and means for moving said guide to disengage such pivoted arms, substantially as described.

15. An intermediate connection for a type-writing machine and a computing-machine, which includes a system of levers side by side and carrying lips, a guide extending across said lips and adapted to direct arms carried by the type-writer into engagement with said lips, means for moving said guide to direct said arms out of such engagement, and means whereby such levers when depressed may actuate the computing-machine, substantially as described.

16. An intermediate connection for a computing-machine and a type-writer, including a system of levers arranged side by side and a guide extending across said levers, combined with a type-writer having pivoted arms carried by the key-levers of numeral-keys, which arms are engaged by said guide and may be moved thereby into or out of position to operate said system of levers, and means for moving said guide independently of the type-writer, substantially as described.

17. An intermediate connection for a computing-machine and a type-writer, consisting of a system of pivoted levers arranged side by side and carrying lips in a line across said levers, a guide extending across the levers and having openings, a spring tending to hold said guide in position with the openings above said lips, combined with a type-writer having pivoted arms carried by the key-levers of numeral-keys which are adapted to extend through the openings, a connection between the shifting mechanism of the type-writer and said guide, whereby when the shift-key is operated the guide is moved to disengage said pivoted arms from said lips, and suitable mechanism actuated by said levers for operating a computing-machine, substantially as described.

18. The combination with a computing-machine and a type-writing machine of an intermediate connection between the two whereby the depression of numeral-keys of the type-writer may actuate the computer, and a cushioning device in said connection whereby numeral-type on the type-writer may strike their platen with the required force and the computer may be operated even though the adjustment between them is not absolutely accurate, substantially as described.

19. The combination with a type-writing machine and a computing-machine each employing depressible keys, of an intermediate connection between them which includes a system of depressible plungers adapted to be depressed by the depression of the keys of the type-writer and to engage and thus depress the keys of the computer, and elastic pads at one end of said plungers, substantially as described.

20. A computing-machine having numeral-adding keys on its upper surface and having a key for another purpose on said upper surface, a box extending upward from the adding-machine and inclosing all said keys, a type-writer adapted to be located above said box, an intermediate connection within the box adapted to convey movement from numeral-keys of the type-writer to the numeral-keys of the adding-machine, and a lever carried by said box and operating to move said additional key, substantially as described.

21. The combination of an adding and printing machine which has an operating-lever to actuate the printing, a type-writer, and intermediate connection between the two whereby numeral-keys of the type-writer may actuate the adding-machine, said intermediate connection including a laterally-movable computer-carriage and a connection between said carriage and said lever whereby the movement of the lever to cause the printing on the computing-machine may also move back the computer-carriage for the next number, substantially as described.

22. The combination of a computing-machine having an operating-lever, a type-writer, and a computer-carriage, a suitable connection between the type-writer and said computer-carriage and between the computer-carriage and the computer, connecting mechanism leading from the computing-carriage to said lever whereby the movement of the lever following the writing of a number may move the computer-carriage to the left for a succeeding number, and means for adjusting said connecting mechanism so that the full movement of the lever may move the carriage different amounts to bring it into position for use with numbers having a different number of digits, substantially as described.

23. The combination of a computing-machine having an operating-lever, a type-writer, and a computer-carriage, a suitable connection between the type-writer and said computer-carriage and between the computer-carriage and the computer, a cord or strap leading from the computing-carriage to said lever whereby the movement of the lever following the writing of a number may draw the computer-carriage to the left for a succeeding number, said lever carrying various points of engagement for said cord or strap which points move different amounts for the full movement of the lever and are proportioned to the movement of the carriage to bring it into position for use with numbers having a different number of digits, substantially as described.

24. The combination of a computing-machine having in its upper surface depressible keys for governing the adding mechanism and having a lever for causing the printing thereof, a computer-carriage above said keys having plungers adapted to engage therewith, a type-writer, a suitable connection between keys thereof and said plungers whereby the depression of keys on the type-writer may depress the keys of the computer according to the position of the computer-carriage, a spring tending to move said computer-carriage to the right, an escapement therefor adapted to be actuated when the plungers are depressed, and a suitable strap or cord extending from the computer-carriage to the left and against suitable guide-pulleys to said lever, substantially as described.

25. A combined type-writing and adding machine having a separate escapement for the type-writing and adding mechanisms, and having three keys one operating the type-writing escapement alone, one operating the adding-escapement alone, and one operating both escapements, substantially as described.

26. A type-writer having a suitable space-bar, mechanism for operating its escapement, combined with a separable intermediate connection adapted to convey movement from numeral-keys of the type-writer to a computer, said connection including a movable computer-carriage, a key adapted to cause escapement of said carriage, said key being so located as to extend into the keyboard of the type-writer when the latter is in place and extend across said space-bar mechanism without interfering with the normal operation thereof, substantially as described.

27. A separable intermediate connection for a type-writing and a computing machine adapted to convey movement from numeral-keys of the type-writer to the computer, said connection including a laterally-movable computer-carriage and a pair of keys adapted to cause escapement of said carriage, said keys being so located as to extend into the keyboard of the type-writer and one of said keys adapted in this position to engage when depressed one of the levers of the type-writer space-bar without interfering with the normal operation thereof, whereby the type-writer space-bar may cause the escapement of the type-writer alone and one of said extra keys may cause the escapement of the computer-carriage alone and the other of said extra keys may cause the escapement of both carriages, substantially as described.

28. The combination with a computing-machine and a type-writer of a separable intermediate connection adapted to be carried by the computing-machine above it and itself carrying the type-writer above it, said intermediate connection having a movable computer-carriage and an escapement therefor, and a key for operating said escapement which key is independent of the type-writer and is located so that when the type-writer is in place it stands within the keyboard also, substantially as described.

29. The combination of a type-writing machine having two sets of numeral-type, keys for operating them, an adding-machine, and an intermediate connection between the type-writer and adding-machine, adapted to operate the latter when one of said sets of type is used but not when the other is used, substantially as described.

30. The combination, with an adding-machine, of a type-writing machine having two sets of numeral-keys, and an intermediate connection between one set of numeral-keys and the adding-machine, the other set of numeral-keys not operating the adding-machine, substantially as described.

31. The combination with a computing-machine, of a connected type-writing machine which may print numerals both with and without operating the computing-machine, and means whereby the visible aspect of such printed product is different in one case from the other, substantially as described.

32. The combination of a type-writer adapted to print numeral characters of the same value but of different kind in their appearance, combined with a computing-machine and a connection between them which is active when one kind of characters is being printed but not when the other, substantially as described.

33. The combination of a type-writer having two sets of numeral-type one set being of a different aspect from the other, mechanism for operating said type, combined with a computing-machine and an intermediate connection between the operating mechanism of one of said sets of type and said computing-machine, substantially as described.

34. The combination of a type-writing machine having two sets of numeral-keys, an adding-machine, and an intermediate connection between one set of numeral-keys and the adding-machine, the other set of numeral-keys not operating the adding-machine, the keys which both print and add producing a different visible aspect in printed result from those which do not add, substantially as described.

35. A type-writer having letter-type and numeral-type of the same font, and an additional set of numeral-type of a different font, combined with a computing-machine, and an intermediate connection between the computing-machine and mechanism of the type-writer which operates said type of different font, substantially as described.

36. A type-writer having two sets of numeral-type of different fonts, finger-keys for operating said sets having differentiated designations thereon, combined with a computing-machine, and an intermediate connection between the computing-machine and mechanism operating one set of such type, substantially as described.

37. A type-writer having a set of numeral-keys extending crosswise of the keyboard thereof, and key-levers extending rearward therefrom, suitable members depending from those key-levers of the type-writer which correspond to said numeral-keys, said depending members being in a row crosswise of the machine, combined with a computing-machine, and an intermediate connection between the type-writer and the computing-machine, which intermediate connection includes a frame, a system of levers located side by side in the same general direction as the key-levers of the type-writer, and a transverse guide directing said depending members into engagement with said system of levers, substantially as described.

In testimony whereof I hereunto affix my signature in the presence of two witnesses.

HOLMES MARSHALL.

Witnesses:
A. C. JOPLING,
I. V. McGLONE.